(12) United States Patent
Zielke

(10) Patent No.: US 7,103,464 B2
(45) Date of Patent: Sep. 5, 2006

(54) AUTOMATIC DISTANCE CONTROL METHOD AND SYSTEM FOR MOTOR VEHICLES

(75) Inventor: Frank Zielke, Barsinghausen (DE)

(73) Assignee: WABCO GmbH & Co. OHG, Hannover (DE)

(*) Notice: Subject to any disclaimer, the term of this patent is extended or adjusted under 35 U.S.C. 154(b) by 232 days.

(21) Appl. No.: 10/830,851

(22) Filed: Apr. 23, 2004

(65) Prior Publication Data

US 2004/0249546 A1  Dec. 9, 2004

(30) Foreign Application Priority Data

Apr. 24, 2003 (DE) ................. 103 18 596

(51) Int. Cl.
*G08G 1/16* (2006.01)
*G08G 7/00* (2006.01)

(52) U.S. Cl. .................. 701/70; 701/78; 701/301; 340/425.5; 340/436; 340/903; 303/121

(58) Field of Classification Search .............. 701/70, 701/78–79, 96, 93, 300–302; 340/435, 436, 340/463, 467, 903, 425.6; 303/121; 180/274, 180/275

See application file for complete search history.

(56) References Cited

U.S. PATENT DOCUMENTS 6,427,111 B1   7/2002   Dieckmann 6,474,753 B1   11/2002   Rieth et al.

FOREIGN PATENT DOCUMENTS

| DE | 44 37 678 A1 | 5/1996 |
|----|----|----|
| DE | 197 34 005 A1 | 2/1999 |
| DE | 199 51 423 A1 | 5/2001 |
| EP | 0 918 673 B1 | 6/1999 |

*Primary Examiner*—Y. Beaulieu
(74) *Attorney, Agent, or Firm*—Kramer Levin Naftalis & Frankel LLP

(57) ABSTRACT

A method and system for automatic control of the distance between a vehicle to be controlled and a lead vehicle. The vehicle to be controlled is equipped with a distance-control device having a distance sensor and a brake device with a brake pedal. The distance-control device controls the speed of the controlled vehicle by delivering a brake-actuating signal to the brake device in such a way that the distance between the vehicles does not become shorter than a predefined distance, the distance-control device also generating a warning signal to the driver if the distance becomes shorter than the predefined distance. The distance-control device changes the brake pedal characteristic in such a way that the brake pedal travel required for injection of increased brake pressure is minimized if a criterion that indicates a danger of collision is present.

16 Claims, 2 Drawing Sheets

AUTOMATIC DISTANCE CONTROL METHOD AND SYSTEM FOR MOTOR VEHICLES

BACKGROUND OF THE INVENTION

The present invention is directed generally to an automatic distance-control method and system for motor vehicles.

In conventional vehicle distance-control systems concerned with maintaining a safe distance between a controlled or following vehicle and a lead vehicle (such as, for example, distance-control systems of the type described in DE 44 37 678 A1 and DE 199 51 423 A1), a measuring device acquires information about the distance from the controlled or following vehicle to the lead vehicle and uses the information to control the speed of the controlled vehicle such that the distance to the lead vehicle does not become shorter than a predefined set distance or a speed-dependent set distance. Such speed regulation can be achieved by intervention of a distance-control device in the brake system or engine controller. Typically, in such conventional systems, the maximum deceleration possible is limited to about 2 m/s$^2$.

In situations in which this limited deceleration is not sufficient to prevent critical close approach, a collision can be avoided only if the driver actuates the brakes by depressing the brake pedal quickly enough and far enough. Tests have shown, however, that in some cases drivers faced with emergency situations do not depress the brake pedal fully and thus do not utilize the full braking force available. These tests have led to the development of devices known as brake assistants. A brake assistant, however, can help only if the driver recognizes the danger situation in time.

EP 09 186 73 B 1 describes a brake system having a brake-actuating device, in particular a brake pedal, provided with a first sensor device for sensing the position and change of position of the driver's foot located in the area of the brake pedal above or on the brake pedal, a second sensor device for sensing a force exerted by the foot on the brake pedal, and a third sensor device for sensing measured values describing a danger of collision of the following vehicle with a lead vehicle. Those measured values are the distance to the lead vehicle, the change in distance to the lead vehicle per unit time, the speed of the controlled vehicle and a predefined time that describes the desired safety time until a collision event. A first arithmetic unit that determines a first brake pressure to be activated on the basis of the output values of the first sensor device is allocated to the first sensor device. A second arithmetic unit that determines a second brake pressure to be activated on the basis of the output values of the second sensor device is allocated to the second sensor device. A third arithmetic unit that determines a third brake pressure to be activated on the basis of the measured values of the third sensor device is allocated to the third sensor device. From the output variables of the three arithmetic units, a coordinating unit determines a coordinated pressure value to be transmitted to a brake pressure generator for appropriately increasing the brake pressure.

It is desired to provide an improved automatic vehicle distance-control method and system that can avoid the danger of collision even in critical situations in which the maximum deceleration attainable by the distance-control system is insufficient to prevent the danger of collision.

SUMMARY OF THE INVENTION

Generally speaking, in accordance with the present invention, an improved automatic vehicle distance-control method and system are provided which avoid disadvantages associated with conventional methods and systems.

According to the present invention, a vehicle distance-control device is designed such that it automatically recognizes a critical situation in which the maximum deceleration attainable by the vehicle distance-control system is insufficient to prevent the danger of a collision, warns the driver and simultaneously modifies the brake pedal characteristic (i.e., the relationship between brake pedal displacement and applied brake pressure) such that a slight actuating pressure, such as a "tap" on the brake pedal by the driver, is sufficient to trigger braking with increased or full brake pressure.

The driver's reflex and reaction time are not shortened—the reflex time being the time needed for the driver to recognize the need to apply the brakes, and the reaction time being the time needed by the driver to move his foot to the brake pedal (e.g., from its present position on the gas pedal, for example) and to apply it to the brake pedal. Rather, what is shortened is the ensuing brake-response time until injection of the increased or full brake pressure to the brake linings, or, in other words, the time until the driver has initiated the braking process with increased or full brake pressure, whereby the vehicle begins to decelerate at an increased or maximum rate by virtue of the actuation of the brake pedal. Under normal circumstances, the idle stroke of the brake pedal (i.e., the range of brake pedal movement that does not correspond to application of brake pressure) must be overcome and the increased or full brake pressure must be built up to achieve such deceleration.

According to the present invention, however, the braking time, or in other words the time needed in order to bring the vehicle to the desired lower speed or to a stop, is simultaneously shortened, and so the danger of a collision is correspondingly diminished. The present invention has the advantage that the danger potential is recognized by a control device, which then automatically initiates partial braking. By this, the driver is always made aware of the danger. The present invention provides that full braking can be initiated independently of actuating speed, even if such actuation is hesitant.

Accordingly, it is an object of the present invention to provide an improved automatic vehicle distance-control method and system that enable full braking to be initiated independently of actuating speed (even if hesitant) to avoid the danger of collision.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawing in which.

DETAILED DESCRIPTION OF THE PREFERRED EMBODIMENTS

Figure 1:
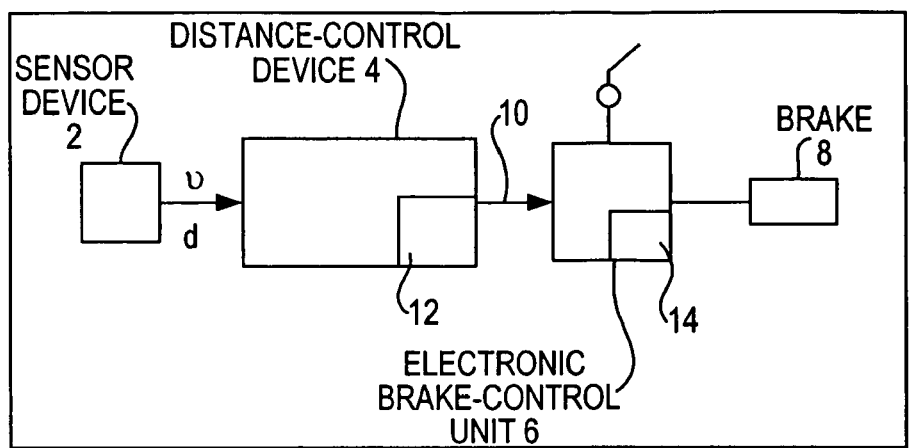
FIG. 1 is a block diagram of an automatic vehicle distance-control system constructed and arranged in accordance with a preferred embodiment of the present invention.

Referring now to the drawing figures, FIG. 1 is a block diagram of a vehicle 1 equipped with an automatic vehicle distance-control system according to a preferred embodiment of the present invention. A sensor device 2 transmits distance signals d and speed signals v to a distance-control device 4. Distance-control device 4 evaluates these signals according to a computer program and calculates the distances to a lead vehicle as well as the speed thereof.

Vehicle 1 also includes an electronically controllable brake system having an electronic brake-control unit 6, which controls at least one vehicle brake 8 as a function of a braking command from the driver as produced by a brake-value generator (such as a brake pedal) actuated by the driver. Brake-control unit 6 is electrically connected via a data line 10 to distance-control device 4. Via data line 10, distance-control device 4 transmits a brake-ready signal, a brake-demand signal or further signals as necessary. Brake-control unit 6 actuates brake 8 as a function of the signals received via data line 10 in such a way that the brake action demanded by distance-control device 4 in order to maintain the set distance to the lead vehicle is achieved.

Figure 2:
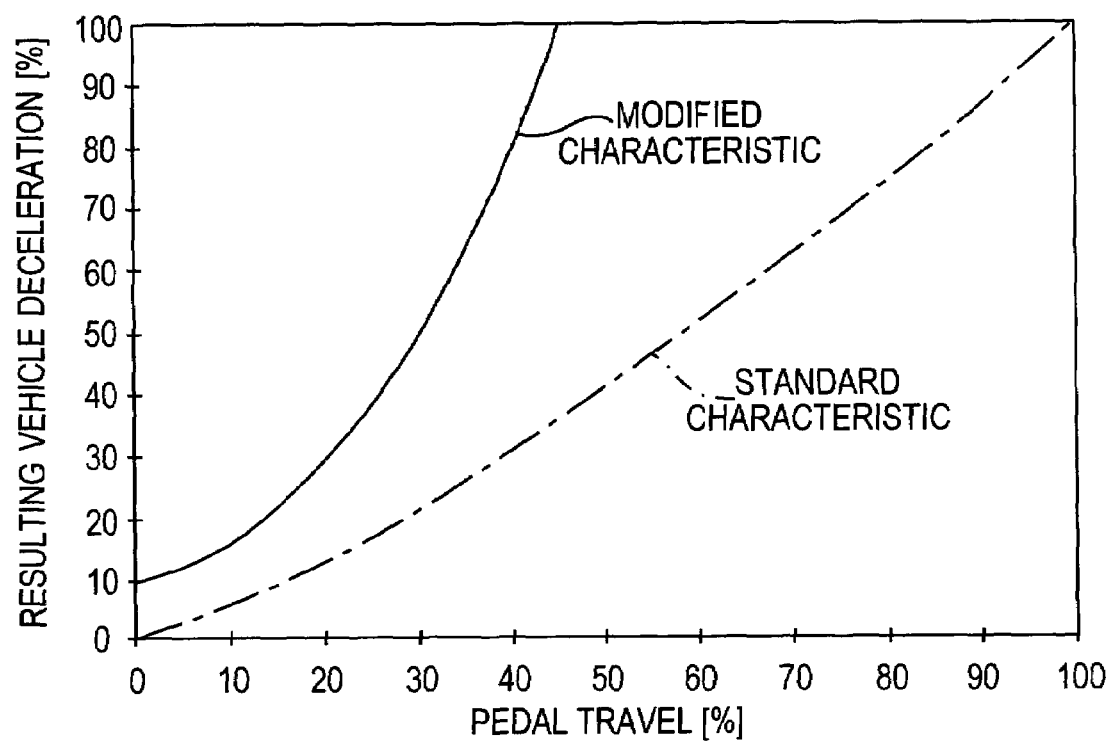
FIG. 2 is a graph illustrating the brake pedal characteristic for normal vehicle operation and modified operation in accordance with a preferred embodiment of the present invention.

Distance-control device 4 includes a program expansion 12, by which the criteria representing the danger of collision are detected and evaluated. Depending on these detected and evaluated criteria, signals for brake-control unit 6 are generated to effect corresponding control of brake 8. For this purpose, there is provided in brake-control unit 6 a further program expansion 14, which has, as shown in FIG. 2, one normal and at least one further brake-value generator (especially a brake pedal) characteristic, which reproduces the vehicle deceleration resulting from actuation of the brake-value generator as a function of the travel of the brake-value generator (e.g., brake pedal travel). This further characteristic is shifted to greater vehicle decelerations at smaller pedal displacement.

Figure 3:
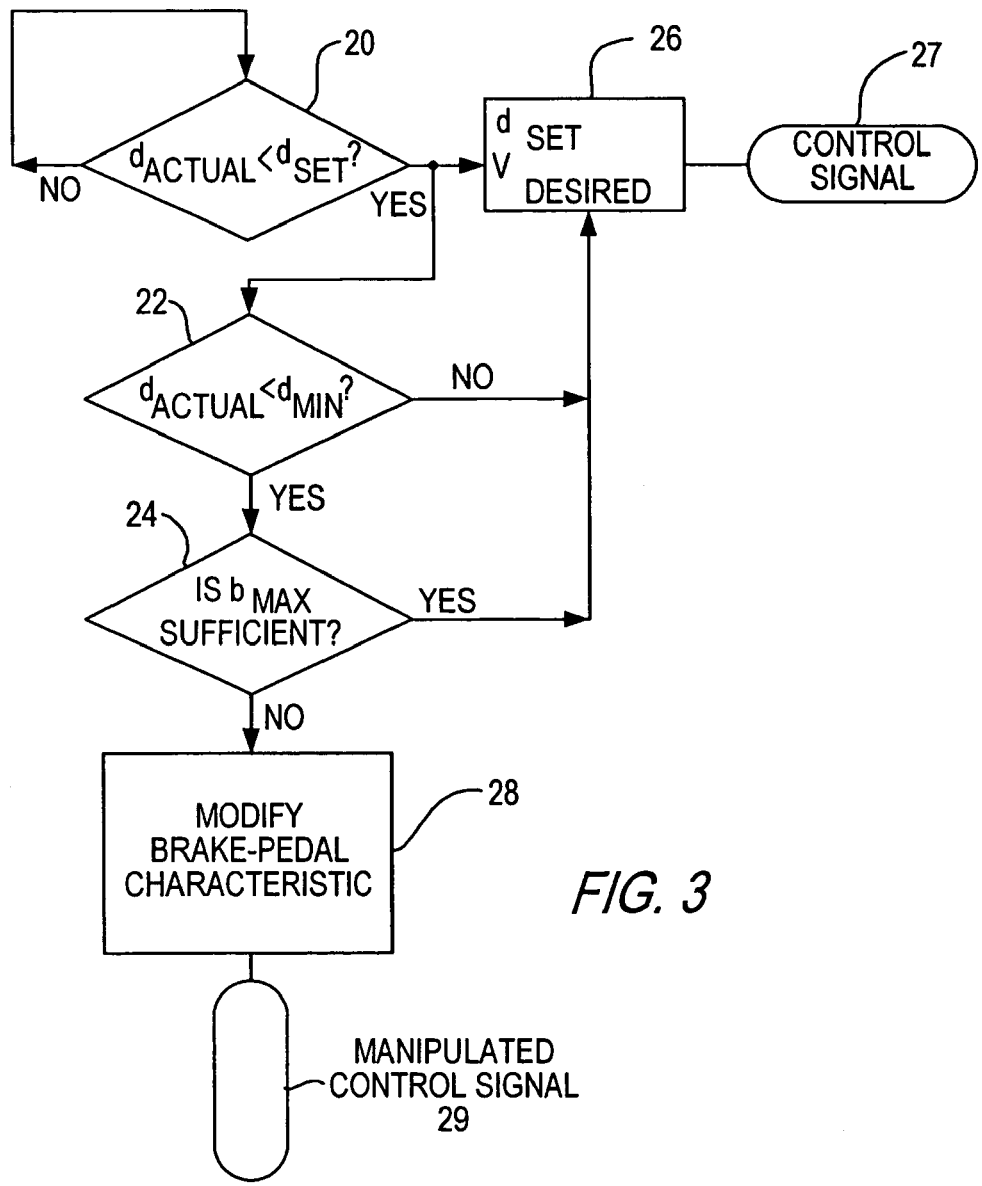
FIG. 3 is a flow chart showing the process flow of a method for automatic vehicle distance-control according to a preferred embodiment of the present invention.

Referring now to FIG. 3, the automatic vehicle distance control method according to a preferred embodiment of the present invention will be discussed. For purposes of the following illustrative example, the situation where the distance between the vehicle to be controlled and a lead vehicle becomes shorter than a predefined minimum distance $d_{min}$ will be used as the basis for recognizing a danger of collision. It should be understood, however, that a variety of danger recognition criteria may be used with the present invention.

At a first step 20, a check is made in distance-control device 4 to ascertain whether the measured actual distance between the controlled and lead vehicles, $d_{actual}$, is shorter than a predefined set distance $d_{set}$. If $d_{actual}$ is not shorter than $d_{set}$, then no brake control signals are generated and the process revisits step 20. If $d_{actual}$ is shorter than $d_{set}$, then appropriate control signals for electronic brake control device 6 are generated (steps 26 and 27), which depend at least on the set value $d_{set}$ to the lead vehicle or may as well be a function of a desired speed $v_{desired}$ of the driver.

At the same time, a check is made to ascertain if $d_{actual}$ is shorter than a predefined minimum distance that represents a danger of collision, $d_{min}$ (step 22); if this is not the case, the control signals as described above are maintained.

If, however, $d_{actual}$ is shorter than $d_{min}$, then, at step 24, a check is performed to ascertain if the maximum deceleration available to distance-control device 4 is sufficient to prevent critically close approach (danger of collision) to the lead vehicle. If the maximum deceleration available to distance-control device 4 is sufficient to prevent critically close approach to the lead vehicle, then the control signals as described above-are maintained.

If the maximum deceleration available to distance-control device 4 is insufficient to prevent critically close approach to the lead vehicle, then at step 28, the existing standard brake pedal characteristic according to FIG. 2 is replaced by a modified brake pedal characteristic, and manipulated control signals for electronic brake control device 6 are generated at step 29. The effect of this modified characteristic is that a short brake pedal travel is sufficient to inject a very high brake pressure into brake 8, and thus to achieve a very high rate of deceleration. Since, distance-control device 4 has already actuated the brake at the instant of brake characteristic replacement, a tap on the brake pedal, e.g., pedal travel of approximately 0%, is sufficient to effect a jump to a preset value of vehicle deceleration, such as 10%, as illustrated in FIG. 2.

It should be understood that several variables can be used for assessment of collision danger. They can be used as individual criteria or in combination to calculate the danger potential, which then represents the basis for triggering the inventive modification of the brake pedal characteristic.

One simple criterion is the previously described example where the inventive modification of the brake characteristic is triggered if the distance between the controlled and the lead vehicles becomes smaller than a minimum distance. Another criterion that can be used in accordance with the present invention is the conventional engineering concept of "time to collision" (ttc), where ttc is the distance between the controlled vehicle and the lead vehicle divided by the speed differential between the vehicles. According to this example, the brake characteristic modification can be triggered when the measured ttc is smaller than a predefined value.

Furthermore, since the speed of the following vehicle, the distance and speed difference to the lead vehicle, and the acceleration of the lead vehicle are known to the distance-control device, the deceleration necessary to prevent an accident can also be calculated and compared with the maximum deceleration that can be requested by the distance-control device. In this case, modification of the brake pedal characteristic is triggered in the event of insufficient braking capacity of the distance-control device.

A predefined maximum relative speed of the controlled vehicle can be used as yet another criterion. The previously discussed criteria can be logically combined with one another or modified if necessary.

Accordingly, the present invention provides an improved automatic vehicle distance-control method and system for avoiding the danger of collision in critical situations in which the maximum deceleration attainable by conventional distance-control systems is insufficient to prevent the danger of collision.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a vehicle including a brake system actuatable by a brake actuating device, a distance-control device having a sensor for measuring the distance between the vehicle and an object, the distance-control device being constructed and arranged to brake the vehicle such that the distance between the vehicle and the object does not become shorter than one of a preselected distance and a preselected vehicle speed-dependent value, the distance-control device also including means for generating a warning signal to a driver of the vehicle when the distance between the vehicle and the object becomes shorter than one of the preselected distance and the preselected speed-dependent value, a method for effecting automatic control of the distance between the vehicle and the object comprising the step of changing, using said distance-control device, a characteristic of said brake actuating device affecting a relationship between said brake actuating device and brake pressure applied by said brake system so as to minimize travel of said brake actuating device associated with at least one of increased brake pressure and maximum brake pressure when a danger of collision between said vehicle and said object is sensed by said distance-control device, said characteristic of said brake actuating device residing in said brake device.

2. The method of claim 1, wherein said brake actuating device is a brake pedal.

3. The method of claim 1, wherein said object is a second vehicle traveling in front of said vehicle.

4. The method of claim 1, wherein a danger of collision between said vehicle and said object is sensed when the distance between said vehicle and said object becomes shorter than a preselected minimum distance.

5. The method of claim 1, wherein a danger of collision between said vehicle and said object is sensed when the speed of said vehicle relative to said object exceeds a preselected maximum value.

6. The method of claim 1, wherein a danger of collision between said vehicle and said object is present when the time to collision between said vehicle and said object is less than a preselected value.

7. The method of claim 1, wherein a danger of collision between said vehicle and said object is present when vehicle deceleration sufficient to avoid collision of said vehicle and said object is greater than a maximum deceleration which can be requested by said distance-control device.

8. The method of claim 1, wherein said brake actuating device is a brake pedal and, as a result of said step of changing said characteristic of said brake actuating device so as to minimize travel of said brake actuating device associated with at least one of increased brake pressure and maximum brake pressure, a slight depression of said brake pedal is sufficient to effect deceleration of said vehicle.

9. An automatic distance control system for a vehicle, comprising a brake system actuatable by a brake actuating device, a distance-control device having a sensor for measuring the distance between said vehicle and an object, said distance-control device being constructed and arranged to brake said vehicle such that the distance between said vehicle and said object does not become shorter than one of a preselected distance and a preselected vehicle speed-dependent value, means associated with said distance-control device for generating a warning signal to a driver of said vehicle when the distance between said vehicle and said object becomes shorter than one of said preselected distance and said preselected speed-dependent value, and means associated with said distance-control device for changing a characteristic of said brake actuating device affecting a relationship between said brake actuating device and brake pressure applied by said brake system so as to minimize travel of said brake actuating device associated with at least one of increased brake pressure and maximum brake pressure when a danger of collision between said vehicle and said object is sensed by said distance-control device.

10. The system of claim 9, wherein said brake actuating device is a brake pedal.

11. The system of claim 9, wherein said object is a second vehicle traveling in front of said vehicle.

12. The system of claim 9, wherein a danger of collision between said vehicle and said object exists when the distance between said vehicle and said object becomes shorter than a preselected minimum distance.

13. The system of claim 9, wherein a danger of collision between said vehicle and said object exists when the speed of said vehicle relative to said object exceeds a preselected maximum value.

14. The system of claim 9, wherein a danger of collision between said vehicle and said object exists when the time to collision between said vehicle and said object is less than a preselected value.

15. The system of claim 9, wherein a danger of collision between said vehicle and said object is present when vehicle deceleration sufficient to avoid collision of said vehicle and said object is greater than a maximum deceleration which can be requested by said distance-control device.

16. The system of claim 9, wherein said brake actuating device is a brake pedal and said means associated with said distance-control device for changing said characteristic of said brake actuating device permits a slight depression of said brake pedal to effect deceleration of said vehicle.

* * * * *